United States Patent [19]

Jacques

[11] 3,846,837

[45] Nov. 5, 1974

[54] STACKED FLEXIBLE DISC UNIT WITH HEAD PLUGS

[75] Inventor: James O. Jacques, Longmont, Colo.

[73] Assignee: Intelligent Memory Systems, Inc., Santa Ana, Calif.

[22] Filed: June 20, 1973

[21] Appl. No.: 371,858

[52] U.S. Cl. .................. 360/99, 360/103, 360/129

[51] Int. Cl. .................. G11b 5/60

[58] Field of Search ........ 340/174.1 E; 179/100.2 P, 179/100.2 Z; 346/137 A, 74 MD

[56] References Cited

UNITED STATES PATENTS

| | | | |
|---|---|---|---|
| 3,108,259 | 10/1963 | Perkins et al. | 360/99 |
| 3,225,338 | 12/1965 | Kelner et al. | 360/99 |
| 3,303,485 | 2/1967 | Lee | 360/102 |
| 3,323,116 | 5/1967 | Solyst | 360/103 |
| 3,489,381 | 1/1970 | Jones et al. | 248/204 |
| 3,618,055 | 11/1971 | UznAcker | 360/98 |
| 3,688,285 | 8/1972 | Lawrence et al. | 340/174.1 E |
| 3,696,351 | 10/1972 | Groom et al. | 340/174.1 |
| 3,729,720 | 4/1973 | Parling | 340/174.1 |

*Primary Examiner*—Vincent P. Canney
*Attorney, Agent, or Firm*—Newton H. Lee, Jr.

[57] ABSTRACT

A flexible disc memory unit has a series of stacked disc units, each having a head plate above the rotatable magnetic disc and a bottom plate, the plates having central air inlets and causing laminar air flow between the disc and the plates. The bottom plate has air pressure control ports. The head plate has head plugs which stabilize the flexible disc in the region of the magnetic head.

20 Claims, 8 Drawing Figures

STACKED FLEXIBLE DISC UNIT WITH HEAD PLUGS

BACKGROUND OF THE INVENTION

Heretofore, flexible or "floppy" disc magnetic recording devices have experienced problems in respect of the trajectory of the disc, as affected by the air film between the flying disc and the head and central plate.

Such devices employ, as is now well known, a thin, flexible disc having on one face an iron oxide coating which can be magnetized by a transducer head, as the disc rotates relative to a head plate which carries a number of the transducer heads for writing on and reading the disc. Being thin and flexible the disc rests on a lower supporting surface, heretofore, generally on the head plate and the heads themselves, located beneath the disc. Air is caused to flow between the disc and the head plate to theoretically provide a desired spacing of the disc from the heads as the disc revolves at high speed, say 1,800 R.P.M.

The magnetic read-write heads or transducers are located in respect of the disc trajectory so as to be closely spaced from the disc during operation.

THE PRIOR ART

Examples of the prior art are:

U.S. Pat. No. 3,688,285, granted Aug. 29, 1972; and

U.S. Pat. No. 3,225,338, granted Dec. 21, 1965.

SUMMARY OF THE INVENTION

The present invention involves novel disc memory apparatus of the general type referred to above, wherein the disc and the head plate are arranged in combination with an air control plate so as to be susceptible of use in stacked assemblies.

More particularly, what may be termed a cartridge or module is provided, comprising an upper plate which consists of a circuit board having transducer heads mounted in head plugs and installed in a number of head plug sockets suitably spaced about a central hub which is revolvable with respect to the head plate, and the hub carries the flexible disc for rotating the latter beneath the head plate. Beneath the disc is an air control and rest plate having openings radiating from the center of the disc. Air inlets are provided between the head plate and the air control plate and the hub, above and below the disc, adjacent to the hub. The head plate or circuit board and the air control or rest plate are assembled together and maintained in a predetermined spaced relation at locations spaced outwardly from the outer periphery of the disc by means adapted to enable the cartridge units to be stacked, one above another, on suitable support members, with a drive shaft extending through the hubs of the respective cartridges.

The arrangement of the air inlet in the circuit board or head plate and the air control or rest plate, respectively above and below the disc, is such that air enters adjacent the hub and flows radially outward between the respective plates and disc in a manner whereby disc stability is improved. In addition, the air control plate provides an essentially flat rest surface for the disc when the disc is stationary.

The head plugs are so constructed as to provide an improvement in the establishment of a desired air gap or air bearing between the magnetic transducer head and the magnetic disc. The head plugs also provide an improvement in the manner of assembling the heads in the circuit board or head plate in a uniform manner with precision projection of the heads from the surface of the head plate adjacent to the disc.

Such a structure assures that the head plate, the heads carried thereby, the air control or rest plate and the rotatable disc are all held in a pre-established position relative to one another.

This invention possesses many other advantages, and has other purposes which may be made more clearly apparent from a consideration of the forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

DESCRIPTION OF THE PREFERRED EMBODIMENT

Figures 1, 5:
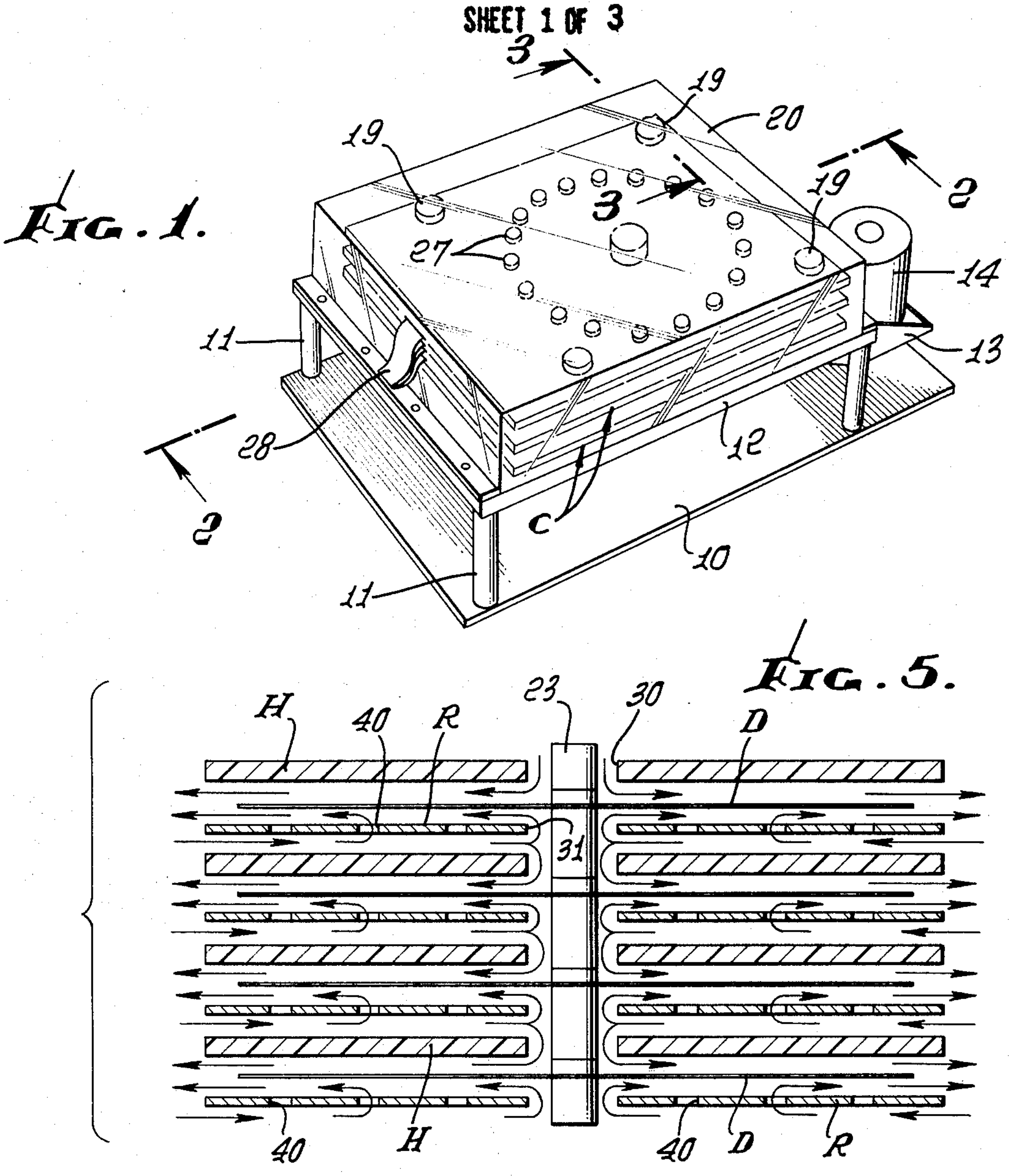
FIG. 1 is a perspective view of a stacked flexible disc unit made in accordance with the invention.
FIG. 5 is a diagrammatic illustration of the air flow between the respective head plates, discs and air control plates.

Referring to the drawings, a rotatable disc memory unit is shown in FIG. 1, including a suitable base 10 having legs 11 which support a base plate 12 in vertically spaced relation to the base 10. Suitably mounted on a bracket 13 beneath the base plate 12 is an electric motor 14 which drives a belt 15 engaged with a pulley 16 located between the base 10 and the base plate 12. The pulley 16 is mounted on and drives a shaft 17 which is supported in a bearing assembly 18 beneath the base plate 12 and extends upwardly therefrom through one or a plurality of disc memory modules or cartridges C. These cartridges C are mounted on a plurality of spaced pins 19, in a manner later to be described, and are enclosed by a suitable cover 20 which may be fixed to the base plate 12 by suitable fastenings 21.

Each cartridge comprises a head plate H, an air control or rest plate R and a thin, flexible magnetic recording disc D, all as will be later described, assembled and held together by means of connector grommet units 22 adapted to be received in stacked relation on the pins 19, and each disc D is carried by a hub unit 23 adapted to be applied to the shaft 12.

Figure 4:
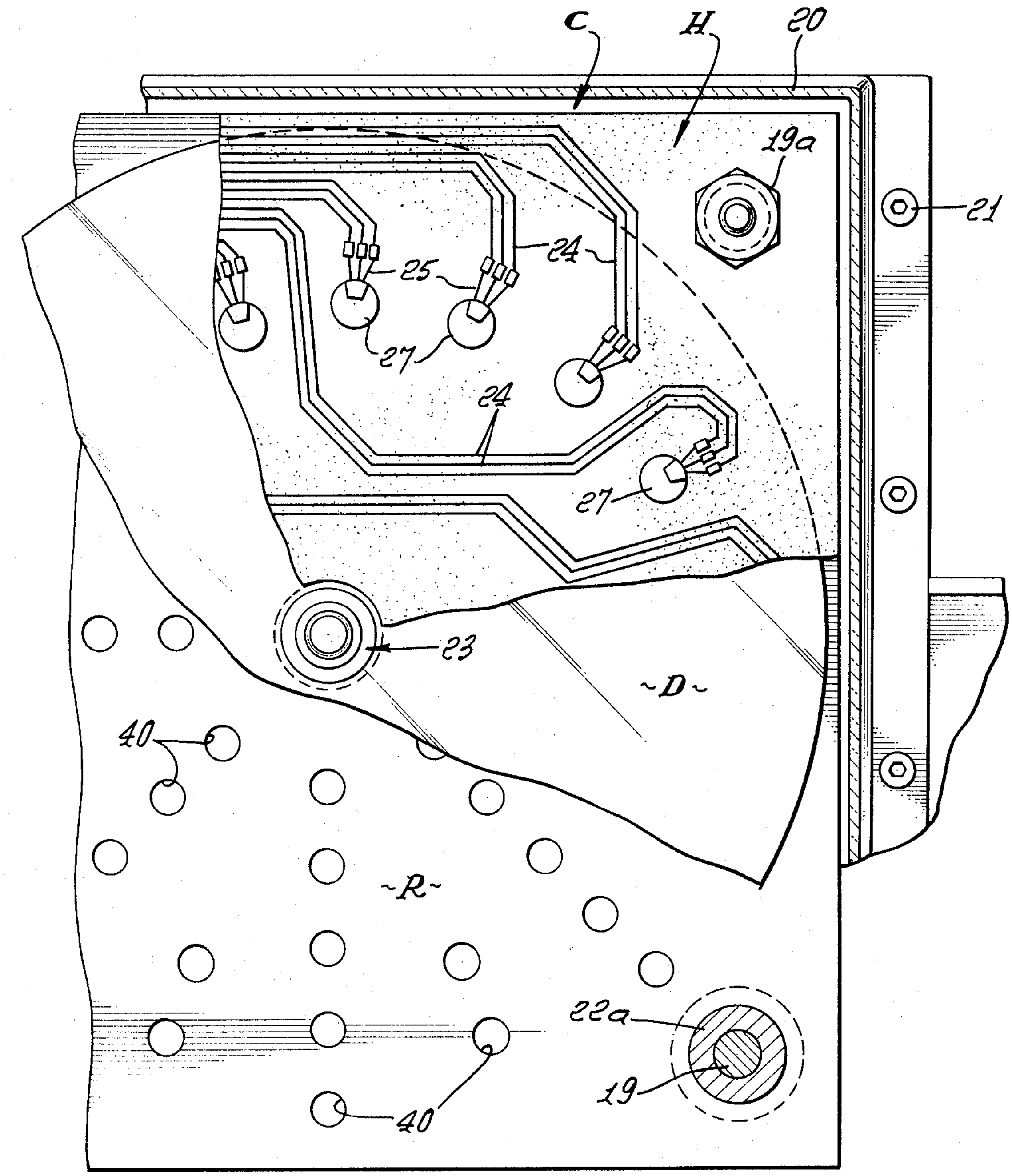
FIG. 4 is a fragmentary plan view as taken on the line 4—4 of FIG. 2.

More particularly, the head plate H is a typical printed circuit board, having, as seen in FIG. 4, the necessary or desired circuit components, generally denoted at 24, connected at 25 to a read-write head 26 which is molded into a head plug 27. It will be understood that the circuitry 24 is connected by a suitable plug, not shown, to conductor cables 28 leading from the cover 20. The details of the specific circuitry and cable connector are not germane to the present invention which involves the structure of the modules or cartridges, and their stackable features and the head plug features, as distinguished from the electrical aspects of the apparatus.

Figures 2, 3, 6:
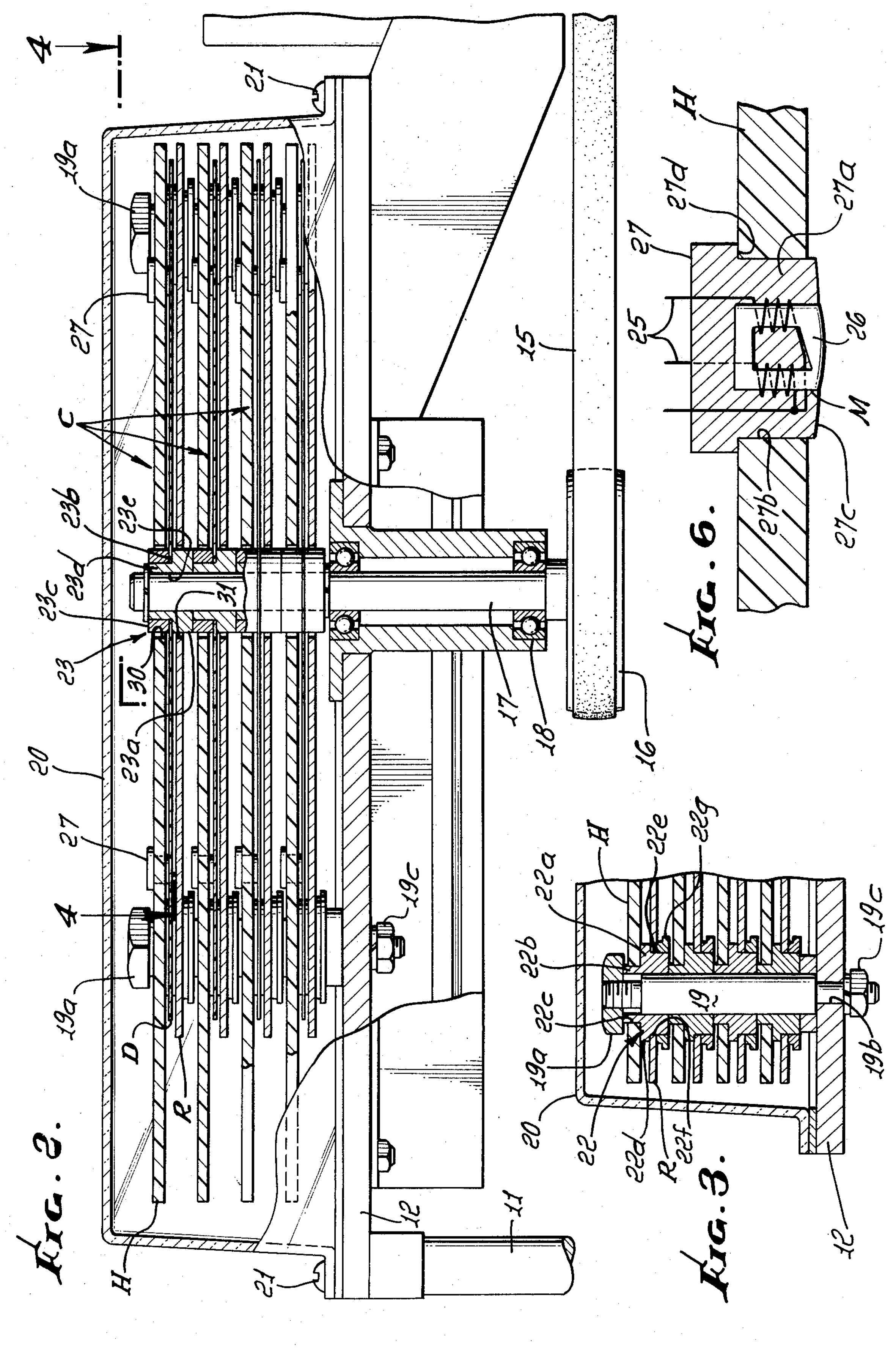
FIG. 2 is a vertical section, substantially on the line 2—2 of FIG. 1, with certain parts shown in elevation.
FIG. 3 is a fragmentary detail section, as taken on the line 3—3 of FIG. 1.
FIG. 6 is a fragmentary detail view in section, showing a typical head plug and head.

As best seen in FIGS. 2 and 3, the grommet units 22, which are located at four positions about the center of the shaft 17, each comprises an insert 22*a* having a cylindrical head portion 22*b* engageable in an opening 22*c* in the head plate H. Below the cylindrical portion 22*b* is a shoulder or flange portion 22d on which the head plate H seats. Extending downwardly from the flange portion 22*d* is another cylindrical section 22*e* which extends through an opening 22*f* in the air control or rest plate R. Also disposed on the cylindrical section 22*e*, beneath the control or rest plate R, is a keeper ring 22*g* which retains the components in an assembled condition. This keeper 22*g* may be frictionally fit on the cylindrical section 22*e* or otherwise retained in place. The upper cylindrical section 22*b* extends upwardly through the head plate H for engagement either beneath the unit 22 thereabove or by a retainer unit 19*a* threaded on the upper end of the respective pins 19. It will be understood that pins 19 of different heights may be secured in sockets in the base plate 12, at 19*b*, by retainer nuts 19*c* to accommodate various members of cartridges or modules C.

At its center, the disc D of each module has a hub 23 including a base element 23*a* which has a seat 23*b* against which the inner periphery of the disc D is clamped by a ring 23*c* press fit, or otherwise secured, on the cylindrical stem 23*d* of the hub unit. Each hub base element 23*a* has a bore 23*e* adapted to receive the shaft 17 to be driven thereby, either by a friction fit or by suitable key means (not shown). When the cartridges are stacked, the hub units are centralized by the shaft 17 and the disc centers are spaced between the plates H and R by engagement of the hub units 23 one above the other.

When the hub units are centralized by the shaft 17 the hubs are concentrically disposed in openings 30 and 31 in the head plate H and rest plate R, respectively, these openings constituting air inlets, as will be later described.

Referring to FIG. 6, a typical head plug 27 is shown. It is composed of a molded plastic having a cylindrical body 27*a* adapted to be press fit into a bore 27*d* in the head plate H. The body projects slightly below the bottom of the head plate H and has a lower surface 27*c* which is slightly domed or crowned downwardly or contoured to minimize shock wave effects on the thin disc, during operation, and thereby enable the maintenance of a desired gap between the magnetic read-write transducer head M in the head 27. To assure precision location of each of the crowned lower ends 27*c* of the respective head plugs 27, and then the precision location of the head M relative to the plate H, the head M is moulded in place in the plug 27 and the latter has a shoulder 27*d* which engages the upper surface of the circuit board or head plate H, the surrounding portion of which is milled or lapped to provide a precise board thickness. The transducer M, per se, is conventional and needs no specific description, except to note that during assembly, the only electrical connections necessary are those which connect the head M to the printed circuitry of the board H, as previously noted at 25.

During use, as will be later described, the rest plate R assists in maintaining the desired air film between it and the disc D. In its preferred form, the plate R has a number of circumferentially and radially spaced rows of openings 40 which have been found to assist in controlling the air flow, later to be described, between the disc D and the rest plate R so as to maintain the air film constant, so that the disc flies freely, without contacting any adjacent parts. Specifically, the openings 40 are five in number in each of eight equally spaced sets radiating between inner openings close to the center of the plate and outer openings adjacent the outer periphery of the disc. While other patterns of openings 40 may be utilized in the assembly, it has been found that the specifically illustrated arrangement, where the openings radiate spoke-like, is most effective to control pressure and in maintaining the desired air flow and disc flight, as diagrammatically shown in FIG. 5.

More particularly, the air flow, as shown by the arrows is laminar, entering the gap between the plates H and R and the flexible disc D, through the inlet ports 30 and 31 around the hub 23. The control plate R provides controlled air flow direction and uniform pressure above and below the disc D, so that the flying disc is stabilized in the narrow air gap, which is exaggerated in FIG. 5, but which in practice may be on the order of only 0.030 inches.

Figure 8:
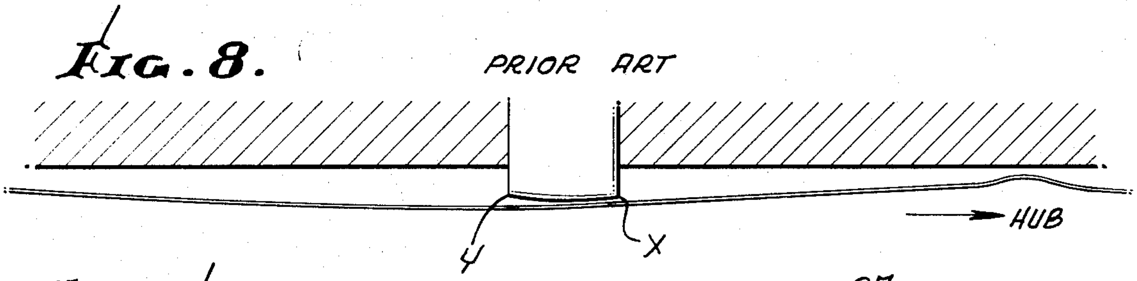
FIG. 8 is a view generally corresponding to FIG. 7, but illustrating a prior art head and disc.
Figure 7:
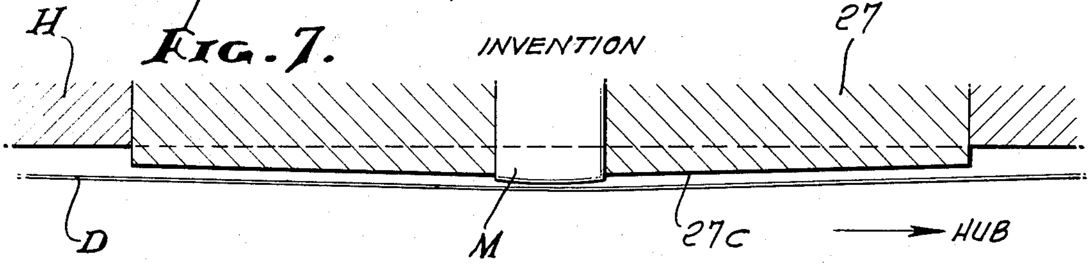
FIG. 7 is a diagrammatic illustration of a typical head plug, head and disc rotating relative thereto, in accordance with the invention.

Flying disc stability is also affected as previously noted, by the contour of the head plugs 27. As seen in FIG. 7, the disc D is caused by the contoured under surface 27*c* of the plug 27 to assume a uniform shape when it passes the head M, with a resultant uniform gap, high quality read-write characteristics, and long disc life. In the absence of such a head plug configuration, however, the disc, as seen in FIG. 8 (Prior Art) encounters a prospective edge cutting problem at the edge X and a separation problem at Y due to non-uniformity of the disc contour, with resultant poor read-write characteristics and In addition, since the heads are above the disc, and the disc rests on the flat upper surface of the rest plate, when the disc is static, disc damage is minimized during start-up, before the air flow effectively causes the disc to fly in the air gap.

From the foregoing, it will now be apparent that the present invention provides a novel, stackable cartridge disc memory apparatus which is easy to assemble and repair, flexible, in that it is susceptible of utilization with one or more cartridges, effective in that the disc will assume the proper contour with respect to the transducer head, and simple, in that only the head need be connected when constructing the cartridge, all other circuitry being incorporated in the circuit board.

I claim:

1. In flexible disc magnetic storage apparatus: a base support, a rotatable shaft projecting upwardly from said base, means for rotating said shaft, and flexible disc storage means disposed about said shaft, said storage means including at least one cartridge unit including a printed circuit head board having a transducer head projecting below said head board, a rest plate below said head board, means supporting said head board and said rest plate on said base plate in vertically spaced relation, a flexible magnetic storage disc disposed between said head board and said rest plate, said disc having a hub on said shaft and rotatable therewith, and said head board and said rest plate having air inlet openings adjacent to said hub for admitting air to the spaces between said head board, said rest plate and said disc.

2. In flexible disc magnetic storage apparatus as defined in claim 1, said means supporting said head board and said rest plate on said base plate comprising pins projecting upwardly from said base plate, and a grommet unit on each pin interconnecting said head board and rest plate together.

3. In flexible disc magnetic storage apparatus as defined in claim 1, said means supporting said head board and said rest plate on said base plate comprising pins projecting upwardly from said base plate, and a grommet unit on each pin interconnecting said head board and rest plate together, said grommet units having spacer means extending above said head board and engageable with a grommet unit of a super-jacent cartridge.

4. In flexible disc magnetic storage apparatus as defined in claim 1, said means supporting said head board and said rest plate on said base plate comprising pins projecting upwardly from said base plate, and a grommet unit on each pin interconnecting said head board and rest plate together, said grommet units having spacer means extending above said head board and engageable with a grommet unit of a super-jacent cartridge, said hub having a spacer means extending above the disc and engageable beneath the hub of the disc of said superjacent unit.

5. In flexible disc magnetic storage apparatus as defined in claim 1, a head plug supporting said transducer head in said head board, said head plug having a crowned end surface extending below said head board about said transducer head.

6. In flexible disc magnetic storage apparatus as defined in claim 1, said rest plate having air pressure control openings spaced between its inlet port and the outer periphery of said disc.

7. In flexible disc magnetic storage apparatus as defined in claim 1, said rest plate having air pressure control openings spaced between its inlet port and the outer periphery of said disc all of said openings being aligned in angularly spaced rows radiating from said hub.

8. For use in flexible disc memory apparatus of the class described: a cartridge comprising a rest plate, a printed circuit head board, grommet units interconnecting said head board and rest plate together in spaced relation at angularly spaced locations, each grommet unit having a central opening for receiving a supporting pin, said head board and said rest plate having aligned openings, a disc hub revolvable in said aligned openings, a flexible magnetic disc carried by said hub between said head board and said rest plate, and a transducer head carried by said head board and extending into the space between said head board and said rest plate.

9. A cartridge as defined in claim 8, wherein each grommet unit has a spacer portion projecting through said head board.

10. A cartridge as defined in claim 8, wherein each grommet unit has a spacer portion projecting through said head board, said hub also having a spacer portion projecting through the opening in said head board.

11. A cartridge as defined in claim 8, wherein said rest plate has air openings in spaced relation between the opening in said rest plate and the outer periphery of said disc.

12. A cartridge as defined in claim 8, wherein said rest plate has air openings in spaced relation between the opening in said rest plate and the outer periphery of said disc in angularly spaced rows radiating from said hub.

13. A cartridge as defined in claim 8, including a head plug supporting said transducer and having a crowned end surface extending into the space between said head board and said rest plate about said transducer.

14. A cartridge as defined in claim 8, including a head plug supporting said transducer and having a crowned end surface extending into the space between said head board and said rest plate about said transducer, said head board and said head plug having coengaged portions for precisely positioning said transducer with respect to said head board.

15. In flexible magnetic disc memory apparatus including a rotatable flexible magnetic disc revolvable relative to a head plate having a transducer, means providing an air inlet, and an air pressure control plate spaced from said head plate, said air pressure control plate having air openings all of said openings being aligned in radially extending rows spaced angularly about the axis of rotation of said disc.

16. A head board for use in magnetic memory apparatus, comprising: a board having an opening therethrough, a molded plastic head plug disposed in said opening, said plug having a magnetic transducer head therein, said plug having an end surface through which said transducer head is exposed, said end surface projecting slightly from said board.

17. A head board as defined in claim 16, wherein said end surface is contoured in an arc.

18. A head board as defined in claim 16, wherein said plug and said board having confronting stop surfaces establishing the projection of said transducer from said board.

19. A head board as defined in claim 16, wherein said plug and said board having confronting stop surfaces establishing the projection of said transducer from said board, and said end surface is contoured in an arc.

20. A head board as defined in claim 16, wherein said plug and said board having confronting stop surfaces establishing the projection of said transducer from said board, the surface of said board engaged by said surface on said plug being machined to establish a precise board thickness.

* * * * *